United States Patent [19]
Cheung et al.

[11] Patent Number: 5,964,838
[45] Date of Patent: Oct. 12, 1999

[54] METHOD FOR SEQUENTIAL AND CONSISTENT STARTUP AND/OR RELOAD OF MULTIPLE PROCESSOR NODES IN A MULTIPLE NODE CLUSTER

[75] Inventors: Yu-Cheung Cheung; William J. Carley, both of San Jose, Calif.

[73] Assignee: Tandem Computers Incorporated, Cupertino, Calif.

[21] Appl. No.: 08/940,348

[22] Filed: Sep. 30, 1997

[51] Int. Cl.[6] .................................. G06F 9/24; G06F 9/40
[52] U.S. Cl. ............................................ 709/224; 709/220
[58] Field of Search .................................. 709/224, 220, 709/221, 222, 223; 379/34, 100.05, 106.01, 133; 714/47; 369/53; 340/853.2, 825.06, 825.07, 825.08; 364/479.14; 187/391, 393; 702/188; 395/838; 377/28

[56] References Cited

U.S. PATENT DOCUMENTS

| | | | |
|---|---|---|---|
| 5,371,852 | 12/1994 | Attanasio et al. | 709/246 |
| 5,452,415 | 9/1995 | Hotka | 709/224 |
| 5,612,865 | 3/1997 | Dasgupta | 364/184 |
| 5,666,486 | 9/1997 | Alifieri et al. | 709/223 |
| 5,715,463 | 2/1998 | Merkin | 395/712 |
| 5,802,383 | 9/1998 | Li et al. | 709/224 |
| 5,822,519 | 10/1998 | Watanabe | 709/220 |
| 5,854,895 | 12/1998 | Nishina et al. | 709/224 |

OTHER PUBLICATIONS

Harline, Matt J. et al.; "Symmetric mutilprocessing workstations and servers system designed for high performance and low cost"; Hewlett–Packard Journal; Hewlett–Packard Company; v47, n1, p. 8(10), Feb. 1996.

Stanczak, Mark; "There's safety in numbers", PC Week; Ziff–Davis Publishing Company; v13, n34, pN1(2), Aug. 1996.

Pietrek, Matt; "Poking around under the hood: a programmers view of Windows NT 4.0"; Microsoft Systems Journal; M&T Publishing Inc.; v11, n8, p. 19(16), Aug. 1996.

Sturdevant, Cameron; "Little escapes LANDesk SMP's reach"; PC Week; Ziff–Davis Publishing Company; v14, n24, p. 106(1), Jun. 1997.

Moozakis, Chuck; "Tandem connects with NT clustering"; InternetWeek; CMP Publications, Inc.; n685, p. 31 (2), Oct. 1997.

*Primary Examiner*—Mark H. Rinehart
*Assistant Examiner*—Marc D. Thompson
*Attorney, Agent, or Firm*—Townsend and Townsend and Crew LLP

[57] ABSTRACT

A computing system comprising a number of multiple processor unit nodes interconnectively connected by a communications system to form a cluster is initialized in a manner that creates separate, independent execution environments for each processor unit. Each multiple processor unit node is configured to operate as a symmetric multiprocessing system with a single, shared memory. During a Startup procedure, memory area segments are created for each processor unit, providing processes running on that processor unit with mutually exclusive access to the associated memory area segment. Startup determines an order of the nodes of the cluster system, and establishes a Coordinator process in the lowest numbered processor unit in the first node of the order. The Coordinator process, when created, directs the remainder of the Startup procedure, and constructs a succession list that identifies the next processor unit in the order to take over the Coordinator process should the first fail.

5 Claims, 5 Drawing Sheets

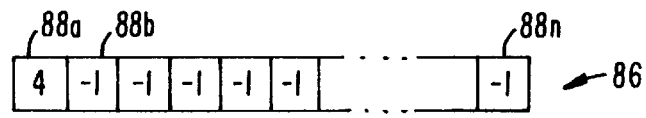
FIG. 3A.
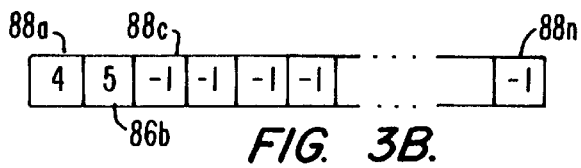
FIG. 3B.
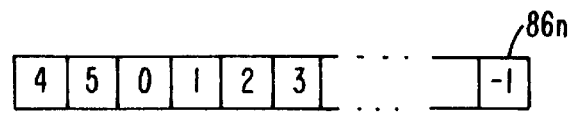
FIG. 3C.
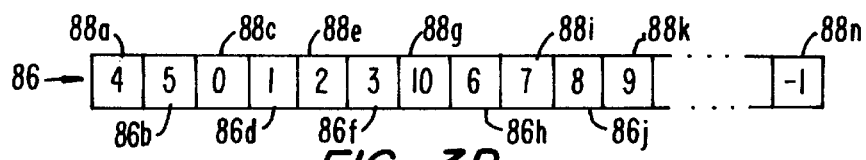
FIG. 3D.
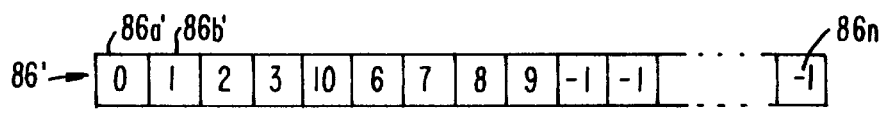
FIG. 3E.
FIG. 2.

METHOD FOR SEQUENTIAL AND CONSISTENT STARTUP AND/OR RELOAD OF MULTIPLE PROCESSOR NODES IN A MULTIPLE NODE CLUSTER

BACKGROUND OF THE INVENTION

The present invention is directed generally to a processing system that includes groups of interconnected symmetric multiprocessing (SMP) systems arranged as a cluster to present a single image view to a system user. In particular, the invention is directed to creating, in a consistent, reliable manner, separate, independent execution environments for each processor unit of each SMP system.

Today, business-critical computing such as securities transactions, automated teller machine transactions, credit card transactions, as well as critical functions (emergency telephone systems, directory assistance requests, cellular calls, internet traffic, etc.), rely heavily on computing environments that utilize multiple processors. Although many multiprocessor architectures exist and are used, one multiprocessor architecture, termed a "cluster", has attained some popularity of late. A cluster generally is a number of independent systems ("nodes") working together as a single entity to provide better performance and enhanced reliability. Clustering can provide highly reliable, highly scalable, fault-tolerant computing, one that can incorporate failover schemes allowing an active node to pick up from a failed node. Further, system resources are always available; nodes do not have to be sitting idle for a failure to occur such as in so-called "hot backup" systems.

A recent extension of the clustering concept has been to use multiple processor units to form one or more of the nodes of the cluster system, and to configure the multiple processor unit nodes as a symmetric multiprocessor (SMP) system. The combination of SMP-based nodes in a cluster, however, provides the best of both possible worlds: a reliable, scalable interconnect architecture together with a robust, parallel software available for business-critical computing as well as other critical functions, described above.

However, SMP systems have scalability constraints. Whether SMP systems are based on a Windows NT operating (Windows, NT, and Windows NT are trademarks of Microsoft Corporation, Redmond, Wash.) or UNIX operating system, they are shared memory entities. When memory and other resources are shared among multiple processors, the addition of processors can result in resource contention. Thus, there exists a need to improve scalability of SMP systems (i.e., adding processor units) so that as processor units are added to an SMP configured node, memory contention problems do not inhibit a corresponding expansion of power, performance, and workload balancing within that node.

SUMMARY OF THE INVENTION

In the first instance, the present invention provides a method for establishing separate, independent execution environments for each processor unit of a cluster node that is configured as an SMP system. The method of the present invention creates those execution environments in a predetermined, sequential order.

Broadly, the method involves determining an order of the cluster nodes, and according to that order starting on a first of the processor units of a first cluster node of that order a Startup/Reload procedure. The Startup/Reload procedure will first create a monitor (MON) process with an affinity for that first processor unit. The MON process, in turn, will create a memory segment area in the shared memory of the node in a manner that establishes the first processor unit with mutually exclusive access to that memory segment area. The MON process will also create a second monitor (MON2) process that will be designated the Coordinator process and be responsible for overseeing and assisting in the remainder of the Startup/Reload procedure. MON and MON2 processes and memory segment areas are then created for each remaining processor unit of the first node, and when complete, the Startup/Reload procedure moves to the second node in the order initially determined. MON and MON2 processes and memory segment areas will also be created for each processor unit of the second node and then the third, and so on.

The procedure continues until all nodes of the cluster have been subjected to this Startup/Reload operation creating a separate, independent, execution environment for each processor unit of each node of the cluster. In addition, completion of the Startup/Reload operation results in each node having identifications of each node, and each processor unit of the node, of the cluster system—information that is needed by each cluster system processor unit for implementing the single system view.

In a further embodiment of the invention, the cluster implements an on-going fault-tolerant operation that maintains a check of the well-being of the cluster. If a node is found to have failed, the invention will remove the identifications of the failed node and the processor units of that node, and distribute these identity removals to the other nodes of the system so that each node's single system image reflects the demise of the failed node. In addition, any transactions started by any of the processor units of the failed node are transferred elsewhere so that the work can either be aborted cleanly, or retransferred back to the failed node if, and when, it should subsequently re-establish itself. If and when the node does reappear, the method of the present invention will again perform the Startup/Reload operation for the node, in the same manner described above, with the addition that any transactions remaining, not yet aborted, are returned to the processor units of the node.

An advantage of the invention is that it prepares the cluster system for a Transaction Monitoring Facility (TMF) for running a primary transaction monitoring process P_TMP on one node to monitor and track each transaction, and the state of each transaction, being executed by the processor units of the cluster system. A Backup Transaction Monitoring process (B_TMP) is available on another node (different from the node running the P_TMP) of the cluster system. Further information respecting distributing transactions, tracking state of transactions, and having the P_TMP take ownership of transactions in the face of failures for aborting or committing them is found in U.S. Pat. No. 5,590,275.

BRIEF DESCRIPTION OF THE DRAWINGS

FIG. 2 is an illustration of a configuration table, showing processor unit identifications and their association with local processor identifications and node identifications;

FIGS. 3A, 3B and 3C show various stages of construction of a succession table, containing the order of succession of the location (by processor unit identity) of a present Coordinator process and a Coordinator process should the present Coordinator node fail;

FIGS. 3D and 3E respectively illustrate completed succession tables before and after failure of a node of FIG. 1 at which the Coordinator process is located;

DETAILED DESCRIPTION OF THE INVENTION

Figure 1:
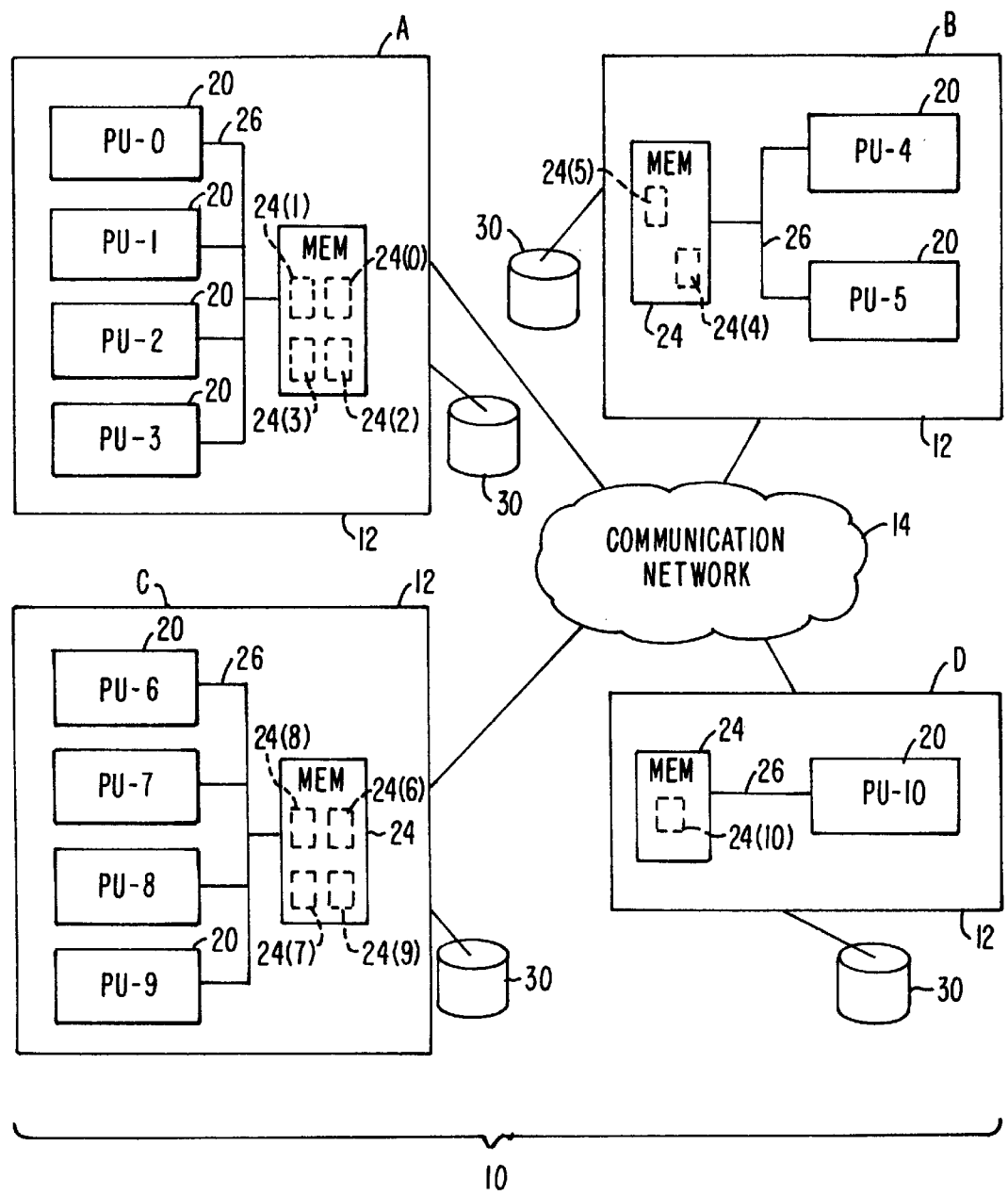
FIG. 1 is an illustration of a cluster system, simplified for the purposes of explaining the present invention.

Referring to the figures, and, first, for the moment, specifically to FIG. 1, there is illustrated a processing system configured as a cluster system 10 of nodes 12 interconnected by a communication network 14. Although only four nodes 12 are shown, it will be evident to those skilled in the art that more nodes can be included. The cluster system 10, for example, may be designed for sixteen nodes 12. Also, the communication network 14 preferably utilizes the router-based system area network configuration taught in U.S. Pat. No. 5,574,849, although other network configurations can be used (e.g., Token Ring, FDDI, Ethernet, etc.).

Each node 12 includes one or more processor units 20 connected to a memory element 22 by a bus structure 26. Each of the nodes 12 preferably include two or more processor units, as the nodes labelled A, B and C illustrate, or they may include a single processor unit, illustrated by the node labelled D. The nodes 12 may include up to eight processor units 20, although more may be used in an expanded design. FIG. 1 shows a maximum of four processor units 20 for any node 12 to preclude unduly complicating the figures and discussion. Those nodes 12 having two or more processor units 20 preferably have them configured as a SMP system, for example by running them under the Windows NT operating system. As such, the multiple processor units 20 of those nodes 12 that are configured as an SMP system will share the memory element 22 of that node. However, there may be one or more nodes 12 (e.g., node D) with only a single processor unit 20. Although node D need not be running under the Windows NT operating system, it is preferred, not only for consistency and compatibility, but for expansion by adding additional processor units 20.

Each of the nodes 12 are structured to employ a "shared nothing" concept; that is, each node is a separate, independent, computing system with its own input/output devices represented, for example, in FIG. 1 by a disk storage device 30. Although only the disk storage device 30 is shown, it should be understood that, in addition to disk storage, other input/output devices (e.g., communication controllers, printers, workstation interfaces and associate workstations) may also be included in the SMP system of each node 12.

Digressing, the architecture of the cluster 10 is well-suited to forming the infrastructure for transaction processing, such as ongoing, personalized interactions over public networks, online transaction processing (OLTP). Many commercial applications available for OLTP require elaborate protection of integrity of user data along with continuous availability to the OLTP applications for end users. For example, automated teller machines (ATMs) for banks must have excellent integrity (i.e., make a minimum of, if any, errors) and ATMs must be available to users for extended periods of time. ATM users would not tolerate mistakes associated with their transactions (e.g., a $500.00 deposit not being credited to the user's account). Moreover, ATMs are often preferably available to users twenty-four hours a day, seven days a week. An architecture, such as the cluster 10 of FIG. 1, serves these purposes well.

A "transaction" is conventionally an explicitly delineated operation, or set of related operations, that change the content of a database or some other data structure from one consistent state to another. The database operations within a transaction are created as a single unit. Either all of the changes performed by the transaction are committed and made permanent, or none of the changes is made permanent (i.e., the transaction is aborted). If a failure occurs during the execution of a transaction, whatever partial changes are made to the database are undone automatically, thus leaving the database in a consistent state. It is the responsibility of a TMP to ensure that the many on-going transactions started by the processor units of the system (e.g., processor units 20 of the cluster 12) be monitored and tracked—not only by the processor unit performing the transaction, but by components of the TMP (i.e., the P_TMP). If the processor unit 20 upon which the transaction is being executed should fail, the P_TMP will take over to drive the transaction, either aborting it, or if it had proceeded sufficiently far enough in its execution, commit the transaction. The tracking of each transaction requires various tables data structures to be maintained in the shared memory 24 by each processor unit 22 starting the transaction that defines the "state" of that transaction at any moment in time (i.e., what other processes and/or processor units are involved, etc.; see, e.g., prior-cited application Ser. No. 08/376,603). The TMP maintains a similar transaction control block (TCB) for every transaction being performed in the cluster.

The method of the present invention starts up the processor units 20 in a manner that establishes for each a separate, independent execution environment. Further, the Startup operation ensures the execution environments are all completed so that no processor unit(s) 20 is (are) left in an uncompleted startup condition. To do this, a single "Coordinator" process is created on one of the processor units 20. The Coordinator process actively participates in a Startup/Reload operation that sequentially initializes each processor unit 20 of each node 12 for TMF in a manner that ensures that no processor unit 20 is left in partially loaded state when the Startup/Reload operation is complete. Should there subsequently be detected a failure of a node, the Coordinator process guides the orderly removal of the identification of the failed node 12 and its processor units 20.

The location of the Coordinator process (i.e., the identity in the cluster of the processor unit on which the Coordinator process is running or has an affinity for) is ultimately distributed throughout the cluster system 10.

Returning to FIG. 1, when power is first applied to the cluster system 10, the individual processor units 20 will automatically come up, as indicated, under the NT operating system. At some time, as is conventional, a Setup operation will be initiated to allow a user to configure the cluster system 10 for TMF, and to install the necessary components of TMF. The Setup operation may be automatic (i.e., the cluster system 10 may be designed to sense how many nodes 12 are included, and how many processor units 20 form each node 12) or it may require user input for such information as the identification of the cluster, its makeup, etc., or a combination of both methods may be used. However design, the Setup operation establishes how many nodes 12 exist in the cluster system 10, how many processor units 20 are included in each node 12, and assign identifications to the nodes 12 (e.g., "A", "B", . . ., "D") and the processor units 20, and install various TMF files and components (e.g., dynamic-link libraries (DLL)) on the disk storage devices 30.

Preferably, a numbering convention is used to identify each of the individual processor units 20 in the cluster in a monotonic order, separately identifying them. Since there are eleven processor units 20 in the illustrative cluster system 10 shown in FIG. 1, they will be numbered 0 through 10 (PU-0, PU-1, . . ., PU-10). Thus, node A includes processor units 20 numbered 0 through 3 (PU-0, PU-1, PU-3). The processor units 20 of node B are identified as 4 and 5 (PU-4, PU-5), while the four processor units of C are identified as 6–9 (PU-6, . . ., PU-9). Finally, the eleventh processor unit 20, contained in node D, is identified as PU-10.

Certain of the information gathered during the Setup operation will be written to the "Registry" maintained by the windows NT operating system, which holds configuration information describing various aspects of the cluster system 10, including the information used to construct a configuration table 60 shown in FIG. 2.

At some time after the Setup program is run, the cluster system 10 will be started for TMF. At that time, the processor unit(s) 20 of each node will load first a Cluster Monitor process and a driver that includes a Cluster component process. (Since the processor units 20 of the nodes A, B and C form SMP systems, the Cluster Monitor and Cluster Service processes will run on any available processor unit 20 of that node at any moment in time.)

Figure 4:
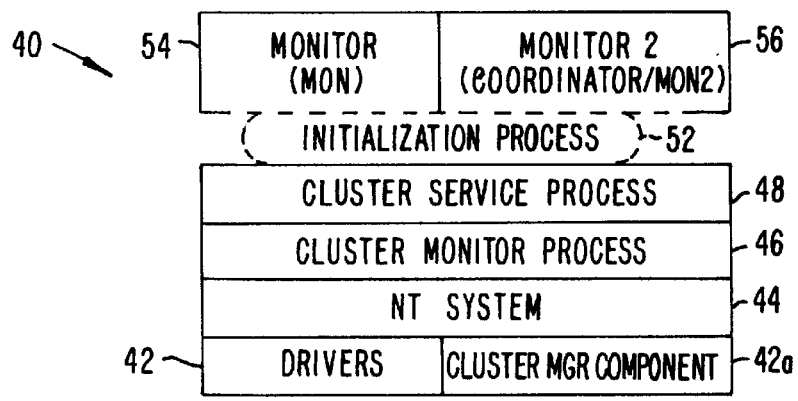
FIG. 4 is a conceptualization of the TMF processes running on each of the processor units of FIG. 1 as installed by the present invention.

FIG. 4 illustrates the levels of abstraction of the various processes installed on the nodes 12 for TMF according to the present invention. FIG. 4 shows, at the most basic level (close to the hardware), various drivers 42 that may form a part of NT operating system 44 or are installed by various facilities and/or applications that may run on the node, such as the Cluster Manager component 42a, described below. (Among other things not relevant here, the Cluster Manager component 42a is responsible for conducting colloquies with its counterparts in the other nodes.) Next is the Cluster Monitor process 46 and the Cluster Service 48, followed by an initialization process (IP) 52 that is used during Startup/Reload operations. IP 52 is illustrated in phantom because (as will be seen) its lifespan terminates when the MON and (MON2) processes 54, 56 are installed on each processor unit 20 of that node. Unlike the Cluster Monitor and Cluster Service processes 46, 48 (and, of course, the NT Operating System and associated drivers 44, 42), the MON and MON2 processes 54, 56 are installed to run on (i.e., "have an affinity for") a specific one or another of the processor units 20, and only that processor unit 20. Thus, for example, when the cluster 10 is fully initialized and reloaded, each of the eleven processor units 20 will have a MON process 54 and an MON2 process 56 specific to that processor unit.

Initially, each node 12 will have only the Cluster Monitor process 46 and the associated drivers (including the Cluster Manager component 42a) installed. The Cluster Manager components 42a of the various nodes 12 will perform a handshaking routine between them to determine an order for the nodes 12. For example, as each node comes up it may establish a date of birth (timestamp) that will be used to establish the order such that the first node up is identified as the first or "oldest" in that order, the second node up being the second or "second-oldest" in that order, and so on. It is not important that exact times be established. For example, two nodes 12 can come up at about the same time and arbitrary selection be made to select one before the other. Nor is it important that their times (dates of birth) be used to establish the ordering. What is important, for reasons that will be explained below, is that an order be established. When the nodes are so ordered, the processor units 20 within each node are similarly ordered by their numbers. Assume the node B is determined the first or "oldest", and nodes A, D and C successively follow in that order. The ordering of the processor units 20 would be correspondingly ordered: PU-4, PU-5, PU-0, PU-1, . . ., PU-b1, PU-6, PU-7, . . . , PU-9.

Information describing the order of the nodes 12 (B, A, D and C) is distributed among the Cluster Manager components 42a of the nodes 12 for use in determining which node begins the Startup/Reload operation first, second, and so on.

Figure 5:
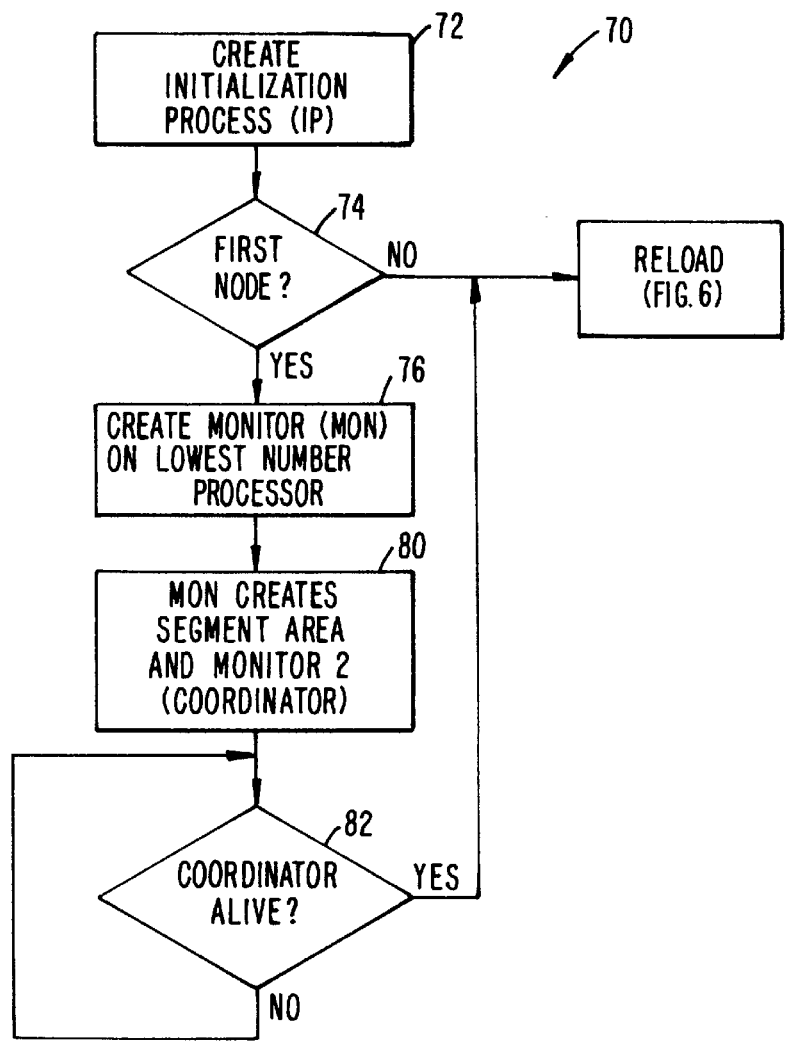
FIG. 5 is a flow diagram illustrating the main steps taken in the Startup/Reload procedure used to initialize the individual processor units of a node.
Figure 6:
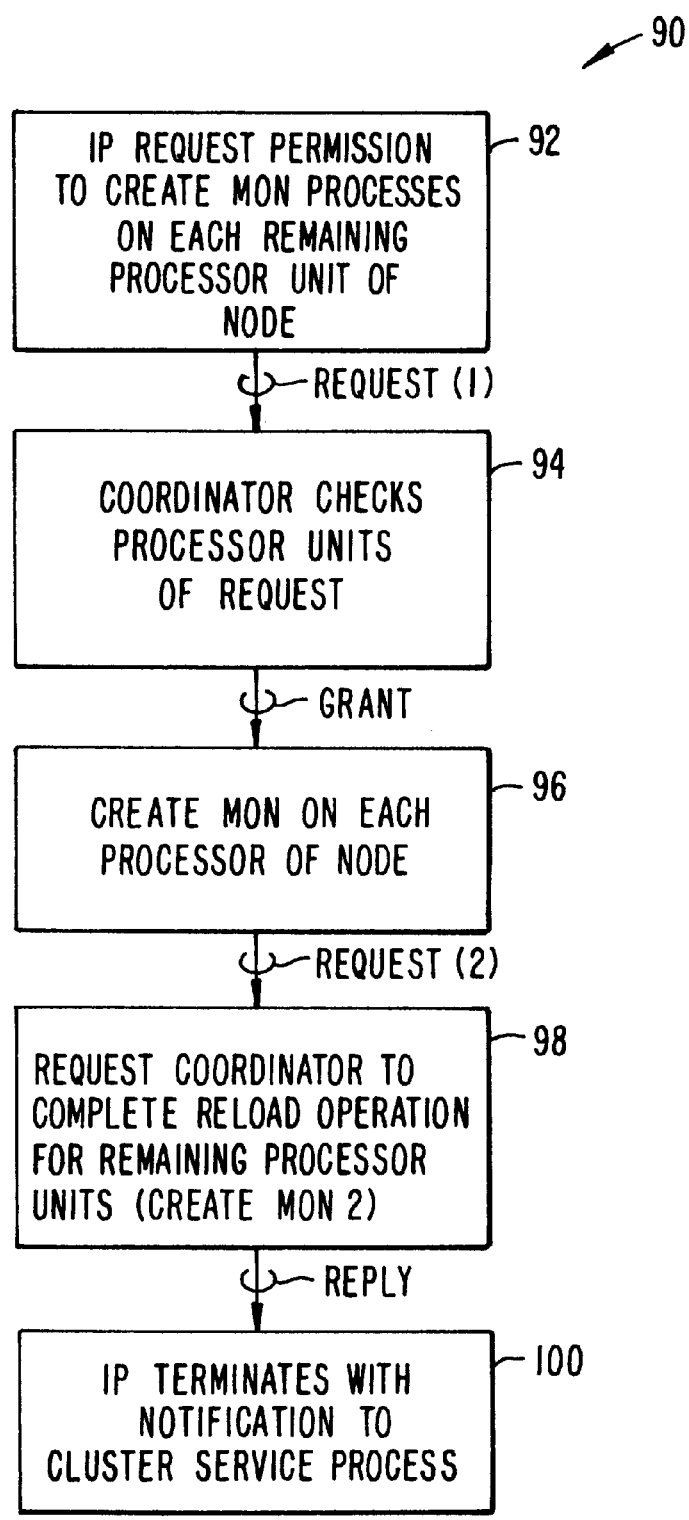
FIG. 6 is a flow diagram illustrating the steps taken in a Reload operation that forms a part of the Startup/Reload procedure of FIG. 5.

With each node now having a Cluster Monitor process 46 installed, the Startup/Reload operation of the present invention can be performed. This operation is outlined broadly in the flow diagrams 70 and 90 of FIGS. 5 and 6. The operation begins at step 72 (FIG. 5) with the Cluster Manager process 46 of each node 12 checking with its associated Cluster Manager component 42a to see if its associated node is the "oldest" or the first in the order. If not, the Cluster Manager process 46 will not receive a reply from its Cluster Manager component 42a, forcing the Cluster Monitor 46 into a wait state. However, the Cluster Manager component 42a that is resident on the first or oldest node 12, will respond to its Cluster Monitor process 46, causing the Cluster Monitor process to create the Cluster Service process 48 for that node. The Cluster Service process 48, in turn will create IP 52 for that node.

The IP 52, when created in step 72, will consult the node's Registry (not shown) and build the configuration table 60 (FIG. 2) using information from the Registry. All nodes have identical Registries (distributed during setup time). As an IP 52 is created on each node, as discussed below, a configuration table 60 is constructed for such node. Ultimately, each node will have a configuration table 60 that is identical to the configuration tables 60 of the other nodes.

It may be convenient to identify the processor units 20 of each node 12 by a "local" number and, therefore, the configuration provides that identification. Thus, for example, the processor unit 20 identified as PU-1 of node A for the cluster system 10 during the Setup operation will have a local number of "1". Similarly, the processor unit PU-8 of the node C is locally identified as "2". The configuration table will have a row 62 for each node 12 of the cluster system 10. Although only four rows are shown, as indicated above, the cluster system 10 can have up to 16 nodes—although more nodes can be used if desired. Accordingly, the configuration table will have 12 more rows (not shown).

Each column 64 of the configuration table 60 represents a processor unit 22 for each node (row). The heading of each column is the local number of the node. Since, as indicated above, each node can have up to eight processor units, there will be eight columns. However, when a node contains less than eight processor units 20, the entry of the configuration table for non-existent processor units will be a "−1". The rows 62 for non-existent nodes will have all entries with a "−1".

The IP 52 will then, at step 74, check to see if it is on the first node of the order by a call to the Cluster Service process 48, which returns a mask informing the IP 52 whether or not it is on the first node. If it is not the first node the check of step 74 will exit to a Reload operation 90 illustrated in FIG. 6. If, however, as here, the IP 52 has been created or started on the oldest node 12 of the established order, it will exit step 74 in favor of step 76 to create a monitor (MON) process 54, and the MON process will set an affinity for the lowest numbered processor of that node: here PU-4. (Herein, when a process is said to have an "affinity for" a processor unit, it is meant that the process will run only on that processor unit, using the Setprocessaffinity function of the NT operating system. For example, in an SMP-configured node, each of the processors, as will be seen, will have created for it a MON and a MON2 54, 56 process that will run only on the processor unit for which it was created. In contrast, the Cluster Monitor and Cluster Service processors may run on any or all the processor units of a node.)

The MON process 54 will, in turn, at step 80, create a memory segment area 24(4) in the memory element 24 (FIG. 1) specifically for the processor unit PU-4 for mutual exclusive access to that memory segment area 24(4). The construction of the memory segment area 24(4) involves creation of a data structure (not shown) with appropriate locks (Mutexes) to ensure such mutual exclusive access to processes running on the PU-4.

Since this is the first created MON process 54 for the cluster system 10, it will also create a MON2 process 56 with affinity for processor unit PU-4 (and its associated memory segment area 24(4)). The first-created MON2 process 54 is designated the Coordinator process, and as will be seen actively participates in the remainder of the Startup/Reload operations for this first node and all remaining nodes. The first-created MON process 54 is the only MON process that creates a MON2 process—the Coordinator process. All other MON2 processes 56 are created by the Coordinator process.

All processor units 20 will have a MON2 process 56. When each MON2 process 56 is initially created it can begin on any processor unit 20 of the node 12 (assuming there are more than two processor units). In addition, when a MON2 process is created, it is passed to the "local" processor unit number with which the affinity of that MON2 process is to be established. The MON2 process will then consult the Cluster Service process 48 of that node for the node order. If the MON2 process 56 sees that it is created on the first ("oldest") node of that node order, and that it has been given an affinity for the lowest-numbered processor unit 20 of that node, it knows that it is the Coordinator process and will proceed accordingly.

The IP 52 will, after creating the MON process 54, wait until it sees that the Coordinator process is sufficiently alive. Then, the IP 52 will proceed from step 82 to the Reload operation 90 of FIG. 6 where, at step 92, the IP 52 will issue a request (REQUEST(1)) to the Coordinator Process, asking for permission to create MON processes for each of the remaining processor units of the node, if any. (Here, this one more processor unit 20 on this node B: PU-5. If this were node D, which has only one processor unit 20, the IP 52 would terminate in the manner described below—without proceeding to the Reload operation 90.) The REQUEST(1) is accompanied by the node identity (here, B).

Before continuing with the Reload operation 90, it may be beneficial to understand the significance of the succession table 86—various stages of which are illustrated in FIGS. 3A–3E, from its form when first created (FIG. 3A) to its form when completed (FIG. 3D). The Coordinator process is responsible for constructing a succession table 86 (FIGS. 3A–3B) with an entry 88 for each possible processor unit 20 of the cluster system 10, ordered according to when a MON2 process 54 is created for that processor unit 20. Since there can be as many as 128 processor units (in the preferred embodiment), there will be 128 entries. At this time, there is only one MON2 process created—the Coordinator process on the processor unit 12 having the Setup identification number PU-4. Accordingly, the first entry 88a of the succession table 86 when initially created (FIG. 3A) will contain a "4", identifying the processor unit 20 on which the Coordinator process is installed (has an affinity for). Also at this time, the remaining entries 88b, 88c, . . . will have a "−1" to indicate they are either nonexistent or have not yet had MON, MON2 processes installed. The Coordinator process will store the succession table in its process address space of the memory element 24, and distribute that succession table to the MON2 processes of all the nodes as each such MON2 process is created. (The MON2 processes similarly each store a copy of the succession table in their own process address space.)

The succession table is used to identify, in the first case, the location of the Coordinator process. That information is specified by the processor unit identification in the entry 88a. In the second case, the successor table will also identify who should be the next Coordinator process, should the first (present) Coordinator process fail.

Returning now the Reload operation 90, step 94, upon receipt of REQUEST(1) the Coordinator process will consult the configuration table for the lowest numbered processor unit in the node identified with the REQUEST(1), and send a message to the MON process of that processor unit. If the Coordinator process gets back a response, it will return to the IP 52 a rejection of REQUEST(1), which will cause the IP, the Cluster Service process 48, and the Cluster Monitor process 46 to terminate, requiring that the node be started over. If, as is expected, an error is returned (i.e., there is no response—such as would happen if the MON did not exist) the coordinator process will then check to make sure that processor units of the node 12 identified with the REQUEST(1) are not in listed in the succession table. The reason for this will become clearer below after discussion of the NodeDown operation 110 of FIG. 7 (and the CPUDown operation it contains at step 118). If the check of the succession table 60 reveals that the processor units of the node identified with the REQUEST(1), or some of them, are still in the succession table, the Coordinator will schedule CPUDown operations for each of those processor units still identified. (The Coordinator process can determine which processor units listed in the succession table by using the configuration table 60 which identifies which processor unit 20 belongs to which node 12.) Any scheduled CPUDown operations outstanding must be performed before the Coordinator process will respond to any REQUEST(1) it may receive. As will be seen, a CPUDown operation results in removal of the affected processor unit from the succession list of not only the Coordinator process, but all MON2 processes 56.

At this initial stage of the Startup/Reload operation, the Coordinator process will recognize that it is the first node (of the order), and overlook operating on the first entry of the configuration table 60 for that node (i.e., node 60), and send a message to the any MON process 54 that may be on the next lowest processor unit (PU-5). If, as expected (because a MON process has not yet been created for this processor unit), a response is not received, the Configuration process will then check the succession table to see if PU-5 is identified (i.e., to ensure that the failure to receive a response to the message to the MON process on PU-5 was because PU-5 was down and the Coordinator process has performed a CPUDown operation for PU-5, removing PU-5 from the succession table). If PU-5 is still identified in the succession table, the Coordinator will schedule a CPUDown operation for that processor unit, and not respond to the REQUEST(1) issued by the IP 52 in step 92 until that CPUDown operation is performed.

Once the processor unit(s) for which the IP 52 has requested permission is(are) checked in the manner described above, the Coordinator process will return a grant (GRANT) to the IP process.

The IP 52, upon receipt of the Grant, will move to step 96, where it will create a MON process on each processor unit 20 for which it made a request—here the processor unit 20 identified as PU-5. When the MON process(es) is(are) created, as before, the created MON process(es) will create a memory segment area exclusively for its processor unit 20 (PU-5) as described above. However, this MON process (and all further MON processes to be created at other nodes 12) does not create a MON2 process as was done by the first-created MON process 54 in step 80 (FIG. 4). That is left for the Coordinator process.

With the creation of a MON process on the processor unit 20 (PU-5), the Reload operation will move to step 98 to issue another request (REQUEST(2)) to Coordinator process, asking the Coordinator process to complete the Reload operation. Thus, as step 98 indicates, the Coordinator process will, sequentially, from the lowest identified processor unit 20 to the highest processor unit 20, create a MON2 process 54 for each such processor unit. As each MON2 process 56 is created, the Coordinator process will update the succession table 86 to identify each processor unit 20 with which the just-created MON2 process 56 is affiliated, and distribute that updated succession table 86 (FIG. 3B) to all MON2 processes 56 of the cluster system 10. (Of course, at this stage of the Startup/Reload operation, there is only the MON2 process 54 on the processor 20 (PU-4), which is the Coordinator process, and the processor unit 22 (PU-5), which does receive the updated succession list 86.)

Once the Coordinator process has created the MON2 process(es) 56, it will reply to the IP 52 that the action solicited by REQUEST (2) has been completed successfully. Upon receipt of that reply, the IP 52 will (step 100) terminate itself with notification to the Cluster Service process 48 of that node B that the Startup/Reload operation performed by node B is complete. The Cluster Service process 48, in turn, will notify the Cluster Monitor process 46, which notifies the Cluster Manager component 42*a* that Startup/Reload of node B is complete. The Cluster Manager component 42*a* of node B will then so inform the other nodes (A, C, D).

The Cluster Manager components 42*a* of the other nodes (A, C, D) will continue to withhold control until the order is checked. The Cluster Manager component 42*a* of the next node in the order, however, will recognize that it is next, and release control to the Cluster Monitor process 46 of that node, which in turn will create a Cluster Service process 48 for that node. Nodes C and D will see that they are not yet the next node, but node A will see that it is the first node. And, the Cluster Service process 48 will then create an IP 52, in the same manner as was done for the node B. That is, the Startup/Reload procedure 70 is again started—this time for node A. The IP 52 once created on the node A (i.e., processor unit 20 (PU-0)), will check to see if it is on the first node in the order. Finding that it is not, it will proceed from step 74 to the Reload procedure 90 of FIG. 5. Steps 76, 80 and 82 of the Startup/Reload procedure 70 are performed only for the first processor unit 22 of the first of the prior-established order to create the Coordinator process.

At step 92, the IP 52 before requesting permission to create a MON process on each of the processor units 22 of node A must first determine where the Coordinator process is located. Since this node A has no MON2 processes yet created, and therefore no access to a succession table 86, the IP 52 will consult the Cluster Service process 48 for the identity of the nodes of the cluster 10 that have completed the Startup/Reload operation. The IP 52 will then construct a message identifying the MON2 process running on the lowest numbered processor unit 20 of one of the identified node(s) to ask for the location (node/processor unit) of the Coordinator process. At this point the only MON2 the Coordinator process (node B, processor unit 20 (PU-4)) which will respond with its identity. The IP 52 will, in step 92, issue a REQUEST (1), asking the Coordinator process for permission to create MON processes on the processor units 20 of that node A. The Reload procedure 90 will proceed as described above:

In response to the request of the IP 52, the Coordinator will consult the configuration table for the lowest numbered processor unit 20 for the node identified with the REQUEST(1), and send a message to a MON process of the processor unit; if no response is received, the Coordinator process will check the succession table 86 (FIG. 3B at this stage) to see if any of the processor units of the identified node are listed and, if so, schedule and perform CPUDown operations; and, respond to the REQUEST(1) with a GRANT if to MON process was found on the lowest numbered processor unit 20 of the node, and no processor units of the node were listed in the succession table 86 (or were removed by CPU-Down operation if listed).

The IP 52 will then create MON processes on each of the processor units 22 of node A (PU-0, . . . , PU-3), each of which, in turn, will create associated memory data segment areas 24 (24(0), 24(1), 24(2), 24(3)) in the memory element 24 for each of the corresponding processor unit.

Step 96 concludes the IP sending another request to the Coordinator process in node B, requesting that it complete the Reload operation for the remaining processor units 20 of node A, if any, which are: PU-0, . . ., PU-3.

The Coordinator will, as requested, create a MON2 process 56 on each processor unit 20 in succession, beginning with the lowest numbered processor unit (PU-0) and proceeding to the highest (PU-3), and as described above, establishing their affinity for the processor unit 20. As each MON2 is created, the Coordinator process will update the succession table 86 and distribute it, as updated, to all active MON2 processes 56 of the system cluster 10.

The Coordinator process will then reply its completion to the IP 52 on node A, which will terminate itself with notification to its Cluster Service process.

Again, the Cluster Manager component 42*a* of node A will communicate with its counterparts in nodes B, C and D, notifying them that the Startup/Reload operation is complete in node A. Node B, seeing that it is already "UP", will take no action. Nodes C and D will each proceed according to that described above, checking to see if they are the next nodes in the order, and if so, initiating the Startup/Reload procedure 70 in the manner as was done for node A to install MON and MON2 processes on each of the processor units 22 of that node.

Ultimately, all processor units 20 of the cluster 10 will be initialized so that each will have a MON and MON2 process 54, 56. The succession table 86, which was updated and distributed as each MON2 process 56 was created, is held in each node by all the MON2 processes of that node.

The Startup/Reload procedure 70, 90 has, in effect, set up for each processor unit 20 a separate, independent execution environment by establishing for each a memory segment area 24(N). The memory units 24 will still have memory areas that are shared (and into which shared global variables and data structures may be kept), but the memory segment areas 24(N) associated with each processor unit 20 will provide mutually exclusive access only to processes running on that processor unit 20. This segmentation and allocation operates to reduce memory contention for data structures that must be accessed by each processor unit 20 of a node 12 for TMF operations. From this advantage follows the fact that as processor units 22 are added to a node, with its own execution environment, memory contention is kept at a minimum so that expansion by the addition of processor units will see a concomitant expansion in processing power.

In addition to the initial Startup/Reload operation for the cluster system 10 to prepare it for TMF, and establishing a cluster image that includes the complete succession list 86 of FIG. 3D, the invention can also modify that system image to account for a failure of a node, and a later replacement of that node.

Detection of a failed node 12 is performed in the following manner. The Cluster Manager components 42a of all nodes 12 perform periodic "I'm Alive" messaging according to the technique taught in U.S. Pat. No. 4,817,091. Briefly, that technique involves, in a multiple processor system, each processor unit periodically sending "I'm Alive" messages to one another. Should one of the processor units fail to send its required "I'm Alive" message, a second processor of the system will take over.

Here, the process is a bit different. The Cluster Manager components, as indicated, send periodic "I'm Alive" messages to one another. Cluster Manager components 42a that note a node fails to send its required "I'm Alive" message will notify the associated Cluster Service process 48. This is the beginning (step 112) of a NodeDown procedure 110, illustrated in FIG. 7. At step 114, the Cluster Service 48 notifies all MON2 processes 56 of that node, which, in turn, will update their corresponding succession tables 86 by deleting the identification(s) of the processor unit(s) from the table of the failed node.

Figure 7:
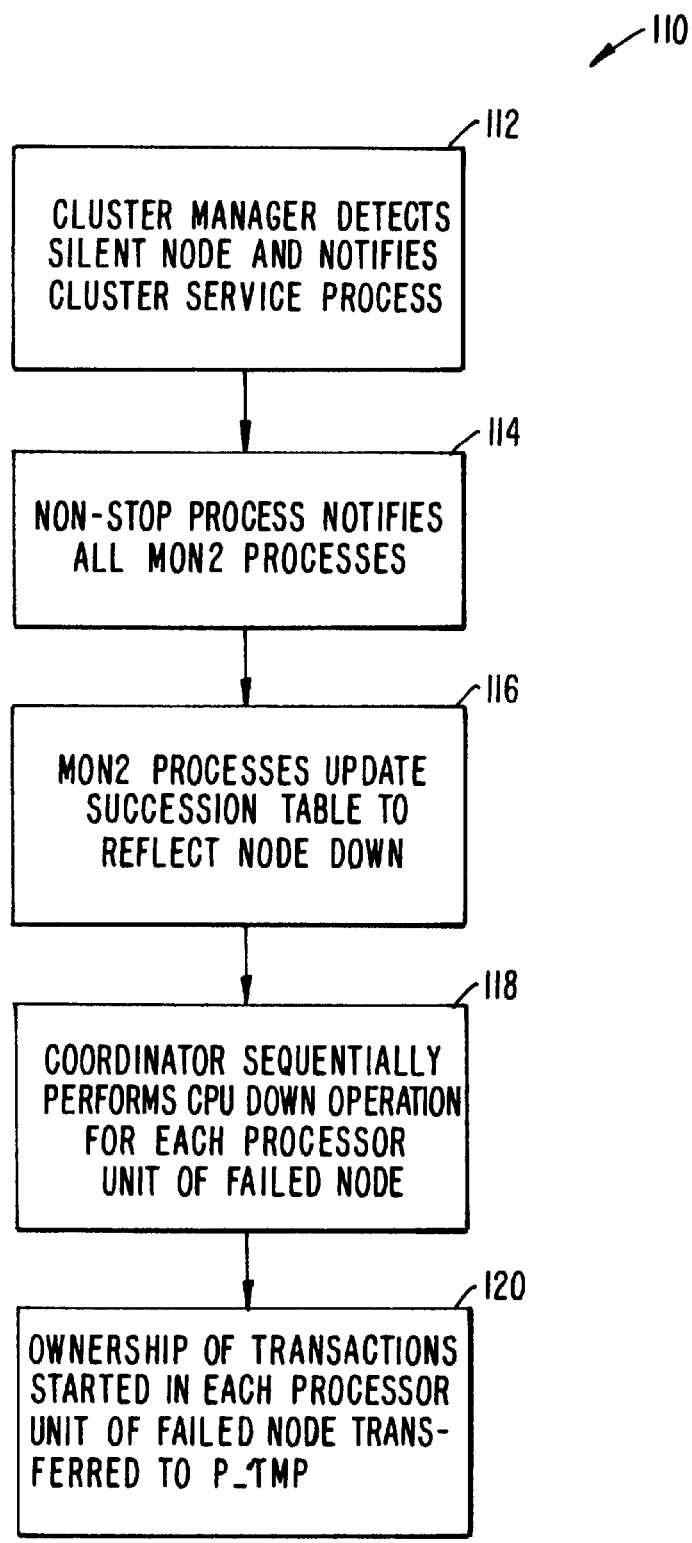
FIG. 7 is a flow diagram illustrating the major steps taken to remove the processor units of a failed node from the cluster image.

Assume, for the purposes of the remainder of this discussion of the NodeDown procedure of FIG. 7, that node B fails. Remember that node B was the one in which the Coordinator (MON2) process was installed on the lowest numbered processor unit 22 (PU-4). When, in step 116, the MON2 processes update their succession table, they do so by checking first the configuration table 60 to determine the identity of the processor units 20 of the failed node B. If it turns out that the failed node contained the Coordinator process, the MON2 process 56 on the lowest numbered processor unit 20 of the next node 12 in line, as indicated by the succession table 86 (i.e., the MON2 associated with PU-0) will assume the responsibilities of the Coordinator process. All MON2 processes 56 will update the succession table to delete the processor identifications for the failed node B (PU-4, PU-5) and move the processor identifications to the right of the removed entries to the left the same number of places as processor unit entries that were deleted.

For example, FIG. 3D shows the succession table 86 before the failure of node B, identifying the processor unit 20 (PU-4) of node B as having the Coordinator process. With the failure of node B, all MON2 processes will remove the entries 4, 5, and all entries to the right thereof (as viewed in FIG. 3D) will be moved two entries to the left so that the succession table now becomes succession table 86' shown in FIG. 3E. The new succession table 86' now identifies, by the content of the entry 86a', the node/processor unit whereat the new Coordinator process resides, i.e. the MON2 process 56 that assumes Coordinator status because the node 12 that was previously inhabited by the Coordinator process has failed.

The MON2 process 56 on the lowest numbered processor unit 20 of node A (PU-0) will assume the duties of a Coordinator process and sequentially perform a CPUdown operation for each processor unit 22 of the failed node. Thus, taking first the processor unit 20 (PU-4), the Coordinator process will message the P_TMP, telling it to take ownership of those transactions started by the processor unit 20 (PU-4). The P_TMP, it will be remembered, maintains a TCB for each transaction in the cluster, and the present state of that transaction. Thus, the P_TMP can, when told to take ownership of those transactions started by processor unit 22 (PU-4), either abort the transactions (i.e., roll them back to the beginning to be started elsewhere), or, if the transaction has proceeded to and beyond a commit, the P_TMP can commit the transaction.

The Coordinator process performs the same CPUdown for each successive processor unit 22 of the node. Here, there is only processor unit 22 (PU-5) left.

When the Coordinator process has transferred ownership of each of the transactions of processor units 20 of the failed node to the P_TMP, the NodeDown operation is terminated.

Suppose now, after the failure of node B, it comes back into the cluster. When powered up, the NT, Cluster Monitor and Cluster Service processes 44, 46, 48 are brought up on the node B. The Cluster Service process 48 will create an IP 52 that is the first step 72 of the Startup/Reload operation 70. The IP 52, noting that it is not (this time) the first or oldest node at step 74 (which includes the Reload operation 90—FIG. 6), will proceed to the Reload operation 90 of FIG. 6. The Reload procedure 90 is conducted in the same manner as described above: In step 98, when the Coordinator is completing the Reload operation by creating MON2 processes 54 for each processor unit 20, it will check with the P_TMP to determine if any transactions previously started by the processor unit 20 have not yet been aborted or committed. If there are transactions left, the Coordinator process will instruct the P_TMP to transfer ownership of the transaction back to the processor unit 20.

When the processor units 20 of the node 12 coming up, node B, have MON2 processes installed, the Coordinator process will update the succession table 86 accordingly, and return to the IP 52 of node B the reply that the request has been completed successfully and, in step 100, as before, the IP 52 will terminate.

Of course, if a node 12 failed was not the one that held the Coordinator process, there is no need for a change in succession. But, in that case, the Node Down operation will still perform as described.

What is claimed is:

1. In a processing system including a plurality of processing nodes communicatively intercoupled, at least some of the plurality of processing nodes comprising a symmetrical processing system having two or more processor units and a shared memory element, a method for installing a computing facility on the processing system that includes the steps:

(a) determining an order of the plurality of processing nodes;

(b) starting an initialization process on a first processing unit of a first one of the plurality of processing nodes according to the order;

(c) the initialization process starting a first monitor (MON) process on the first processor unit and establishing an affinity of the MON process for the first processor unit;

(d) the first MON process creating
   (i) a first memory segment within the shared memory element for the first processor unit and
   (ii) a Coordinator process to run on the first processor unit;

(e) the initialization process launching a reload process that starts a second MON (mon2) process on each remaining processor unit of the first one of the plurality of nodes, if any;

(f) thereafter, creating in each of the other of the plurality of nodes according to the order a second initialization process and, for each processor unit of each of the other of the plurality of nodes, a MON, a second memory segment area within the shared memory element, and a MON2 process having affinity for such processor unit.

2. The method of claim 1, wherein the first initialization process terminates after the MON and MON2 processes are created.

3. The method of claim 2, wherein the second initialization process in each of the plurality of nodes terminates after the MON and MON2 processes are created for each processor unit of such node.

4. In a processing system including a plurality of processing nodes communicatively intercoupled at least some of the plurality of processing nodes comprising a symmetrical processing system having two or more processor units and a shared memory element, a method for installing a computing facility on the processing system that includes the steps:

determining an order of the plurality of processing nodes;

sequentially initializing each of the plurality of processing nodes according to the order by, creating on a first processor unit of a first of the plurality of nodes a first monitor process and a Coordinator process, the first monitor process creating a memory segment in the shared memory for the first processor unit, creating on each of any remaining processor units of the first node a second MON process and a second memory segment area in the shared memory for the first node; and for each succeeding node of the order, creating on each processor unit of such succeeding node a second MON process and a second memory segment area in the shared memory for the first node.

5. The method of claim 4, wherein the Coordinator process constructs a succession table identifying an order of the processor units of the system, the order being indicative of each succeeding node of the order, which processor unit is next in order to have created thereon a successor Coordinator process should the Coordinator process fail.

* * * * *